Figure 1:
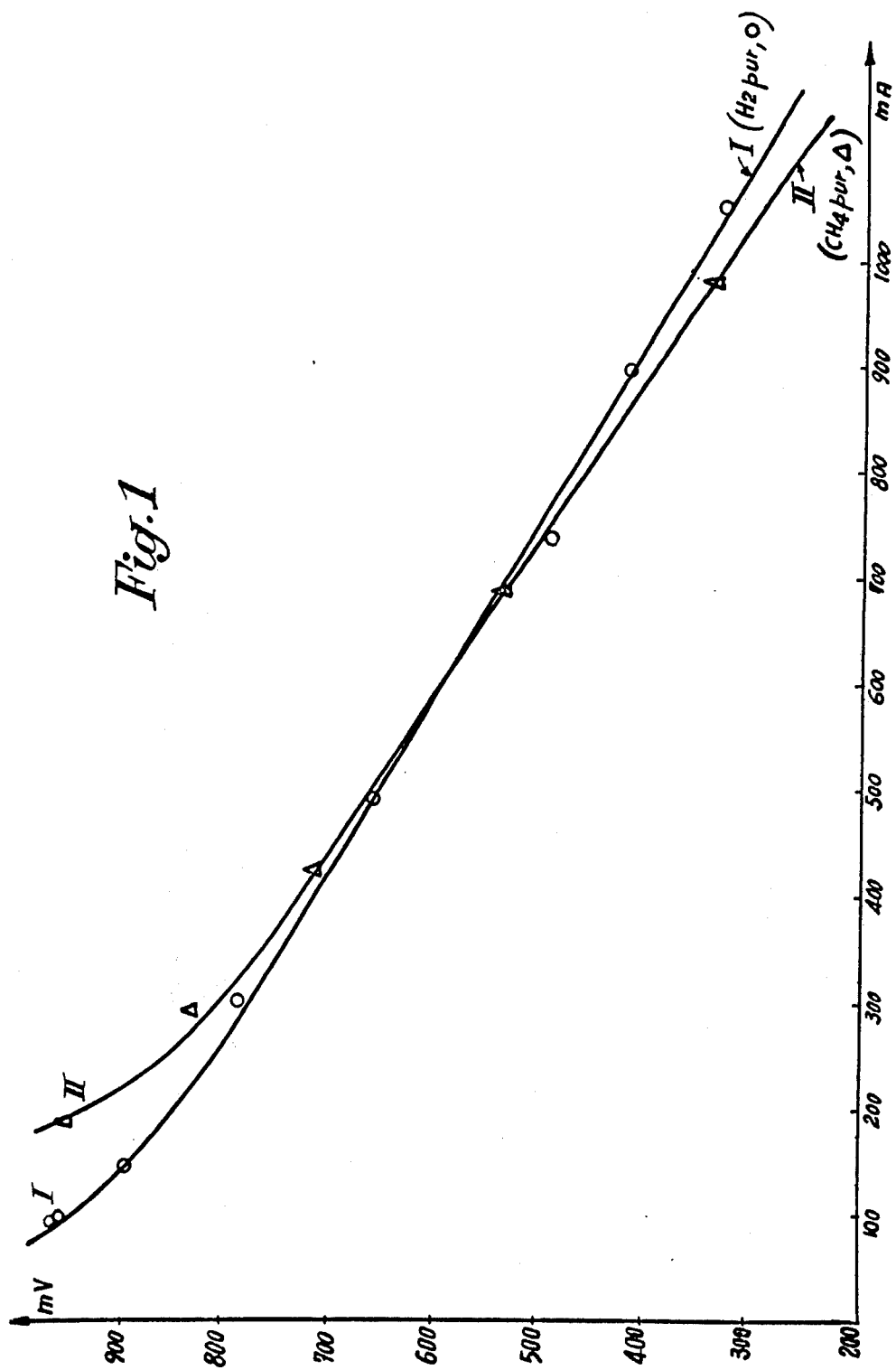

United States Patent [19]
Bezaudun et al.

[11] 3,981,746
[45] Sept. 21, 1976

[54] ELECTRODE FOR FUEL CELL

[75] Inventors: Jean Bezaudun, Ris-Orangis; Joseph Edouard Weisang, Le Havre, both of France

[73] Assignee: Compagnie Francaise de Raffinage, Paris Cedex, France

[22] Filed: June 7, 1971

[21] Appl. No.: 150,827

Related U.S. Application Data
[63] Continuation of Ser. No. 776,841, Sept. 9, 1968, abandoned.

[30] Foreign Application Priority Data
Sept. 7, 1967  France .................... 67.120332

[52] U.S. Cl. .................... 429/13; 429/29; 429/33; 429/45
[51] Int. Cl.² .................... H01M 4/00; H01M 8/00
[58] Field of Search .......... 136/86 R, 86 D, 120 FC

[56] References Cited
UNITED STATES PATENTS

| | | |
|---|---|---|
| 3,219,730 | 11/1965 | Bliton .................... 136/120 |
| 3,235,407 | 2/1966 | Nicholson et al. .................... 136/86 |
| 3,432,314 | 3/1969 | Mazdiyasni et al. .................... 136/153 |
| 3,451,856 | 6/1969 | Fraase et al. .................... 136/120 |
| 3,470,031 | 9/1969 | Fukuda .................... 136/120 |

*Primary Examiner*—John H. Mack
*Assistant Examiner*—H. A. Feeley
*Attorney, Agent, or Firm*—Curtis, Morris & Safford

[57] ABSTRACT fuel cell has been provided having an electrolyte of solid, fritted ceramic suitable for operation at high temperatures and for operation on a hydrocarbon or hydrogen as a fuel and oxygen or oxygen containing gas as a comburant comprising of: as an electrolyte, a cubic phase-stabilized zirconia; a cathode; and as an anode, an electron collector and an oxidation catalyst. A method for preparing the anode therefor has been provided as well as a method directed to the operation of said fuel cell.

7 Claims, 2 Drawing Figures

ELECTRODE FOR FUEL CELL

This application is a continuation of application 776,841 filed Sept. 9, 1968 now abandoned.

The present invention relates to an electrode for a fuel cell; more particularly, the present invention pertains to an electrode for a fuel cell having a solid electrolyte and which cell operates at high temperature.

It is known that the percent of recoverable free energy in electrochemical combustion is theoretically equal to 100%, whereas compared thereto, a maximum of about 50% is recoverable in a combustion system employing the Carnot cycle. Therefore, theoretically, fuel cells permitting electrochemical combustion should supplant internal combustion engines which operate according to Carnot cycle for conversion of chemical energy into mechanical energy.

Unfortunately, the theoretical percent of recoverable energy is not yet attainable, and fuel cells are still the object of fundamental research; and fuel cell research has not yet led to interesting commercial or industrial applications. As a matter of fact, the goal of top theoretical efficiency of 100% is erroded rapidly because of losses due to the elements of the cell itself, independently of the external medium in which it operates. These losses are due in particular to the resistance offered by the electrolyte to the passage of the ions and due to a series of phenomena which are combined under the name of polarization. The latter takes place in the vicinity of the electrodes and is due to kinetic considerations of the reactions taking place on the surface of the electrodes.

As a result of lengthy studies and careful development, nevertheless, it has been possible to cause fuel cells to operate with a fuel to comburant (combustion supporting agent) system composed of simple elements, namely oxygen for the comburant and hydrogen or carbon monoxide for the fuel. However, the weight to power ratio of such fuel cells can scarcely drop below 10 kg/kw.

Contrarywise and despite the considerable economic interest in substituting hydrocarbons for hydrogen, as yet it has not been possible to effect the direct electrochemical combustion of hydrocarbons in a fuel cell. At the present time, the only method which can be employed to obtain a sufficient conversion of energy from hydrocarbons consists in transforming hydrocarbons, for instance by reforming these with steam, into $H_2$ and CO, but this reaction is carried out in a converter independent of the cell and, therefore, increases the weight of the power generating unit. Thus, the weight to power ratio of installations and for conversion of hydrocarbon combustion energy into mechanical energy by electrochemical combustion is at present about 30 kg/kw.

In accordance with the invention, the novel electrode makes it possible to effect the electrochemical combustion of hydrocarbons in a fuel cell operating with a solid electrolyte and at high temperature, by obtaining a specific power similar to that which results, for instance, from the electrochemical combustion of hydrogen.

In fact, it has been observed that if a current collector and an oxidation catalyst are combined at the surface of a solid electrolyte of a fuel cell, for instance at the zirconia surface, which is a cubic phase-stabilized zirconia, this cell, when fed with a hydrocarbon as fuel and with air as comburant, supplies a power similar to that which is obtained when feeding the same cell with the hydrogen-oxygen system.

Therefore, the object of the invention is an electrode for a fuel cell operating with a stabilized zirconia solid electrolyte and at high temperature and comprising in combination an electron collector and an oxidation catalyst. This electrode is used essentially as anode for a fuel cell.

Figure 2:
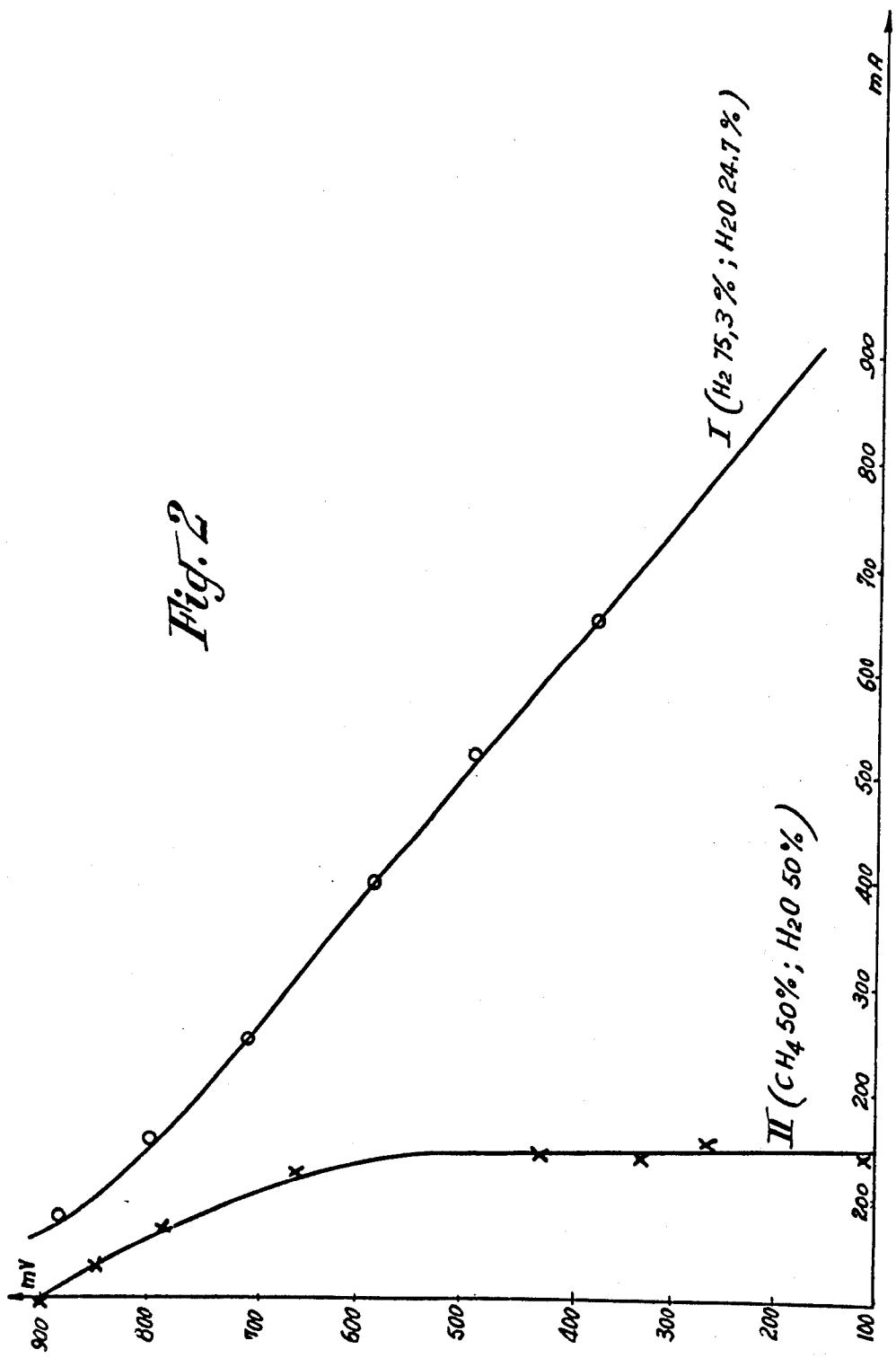

With reference to the enclosed drawings, the contribution to the fuel cell art is illustrated as shown in the Figures wherein:

FIG. 1 illustrates the performance of the novel fuel cell when operated with methane as fuel and air as oxygen providing comburant as well as with hydrogen as fuel and air as oxygen providing comburant; and FIG. 2 illustrates the performance characteristics when a fuel cell with conventional electrodes and the same electrolyte is operated with a mixture of methane and steam or hydrogen and steam as fuel and in each instance air as oxygen providing comburant.

The electron collector may be metal or a conductive oxide or even a ceramic which has been made conductive. In particular, it may be a compound of zirconia, a stabilizing oxide therefor, and uranium oxide, the latter imparting electronic conductivity to the zirconia.

The electron collector is preferably in direct contact with the solid electrolyte of the fuel cell. Thus, for instance, metallic silver is deposited on cubic, phase-stabilized zirconia by applying a silver paint to it; or else, the conductive ceramic electrode containing uranium oxide is projected onto cubic phase-stabilized zirconia which is used as electrolyte.

As an oxidation catalyst, it is advantageous to use, for example, chromium, silver, molybdenum, tungsten, vanadium, copper oxides, etc. alone or combined with each other, or in the form of salts such as the chromates, vanadates, tungstates, etc.; these various catalysts may, obviously, be combined with each other without going beyond the scope of the invention. Moreover, these catalysts may form various combinations or complexes in situ, when combined with each other and under the high temperature, reducing atmosphere at the operating conditions of the cell. One particularly effective oxidation catalyst for the invention consists of chromium oxide and silver (at 800°C the silver oxide is reduced to its metallic form); another oxidation catalyst consists of vanadium oxide. Of course, the catalysts indicated above have been given merely as an illustration and not as a limitation.

The combination between the current collector and the oxidation catalyst may be effected in various forms. A layer of catalyst may, for instance, be deposited on a metal electrode; the catalyst may also be distributed within a ceramic electrode; a layer of catalyst may also be deposited on the ceramic collector.

The method of manufacture of the novel electrode varies, depending on the form of the combination between the current collector and the oxidation catalyst. In order to produce a ceramic electrode containing the catalyst distributed throughout it, a mixture of the ceramic and the catalyst can be projected onto the surface of the electrolyte. In order to deposit a layer of catalyst on the collector and as an example, an oxidation catalyst is also suitably decomposed on the collector compound which produces the oxidation catalyst as a result of this decomposition.

An electrochemical cumbustion of all hydrocarbons can be effected by a cell with solid electrolyte of stabilized zirconia operating at high temperature and equipped with an electrode in accordance with the invention. Thus, it is found that methane behaves like the other hydrocarbons, which is entirely remarkable if it is borne in mind that methane is a particularly stable hydrocarbon and that even at 800°C it has no tendency to decompose by cracking so as to produce hydrogen. Furthermore, both with methane and with heavier hydrocarbons such as butane, it is found that practically no deposit of carbon is formed on the surface of the electrode.

The cells which can be equipped with the electrode of the invention are all cells which operate at a high temperature, i.e., at 650°C and above, the electrolyte of which is a solid conducting oxygen ions such as cubic phase-stabilized zirconia. The stabilizing of the zirconia can be achieved by means of various stabilizing oxides and in particular by means of calcium oxide, a mixture of lime and magnesia, yttrium oxide or rare earth oxides. Rare earth oxides which are particularly recommended for stabilizing zirconia in the cubic phase are those of the elements having atomic number between 62 and 71, i.e., from samarium oxide ($Sm_2O_3$) up to lutetium oxide ($Lu_2O_3$), as indicated in French Pat. No. 1,390,239.

The other electrode of the cell may be formed in any manner known in the art. It may be a metallic conductor or a ceramic electrode.

The invention is further illustrated by the following examples, which are not to be construed as limiting the disclosure.

EXAMPLE 1

A cell element equipped with an electrode in accordance with the invention is produced in the following manner:

A tube of zirconia stabilized by yttrium oxide of the molecular composition of 90% $ZrO_2$ and 10% $Y_2O_3$ is provided. This tube may be obtained, for instance, by high-temperature fritting (of the order of 1800° – 2200°C) of a powder containing the two oxides in the proportions indicated. The inside diameter of the tube is 9.5 mm and its outside diameter is 12.7 mm; thus, the thickness of electrolyte is 1.6 mm.

A layer of silver is deposited on the inner wall of the tube extending 5.5 cm, using for this purpose a silver paint applied by a brush. The deposited layer of paint is then heated in order to evaporate the solvent and leave on the electrolyte a layer of metallic silver which serves as cathode for the fuel cell.

In order to deposit a layer of metallic silver and catalyst on the outer wall of the electrolyte tube, one proceeds in a similar manner as described above over the same, coextensive length. Thereafter, on said layer of silver, an aqueous catalyst solution of chromium nitrate ($Cr(NO_3)_3$) and of silver nitrate ($AgNO_3$) is sprayed so as to deposit one molecule of $Cr(NO_3)_3$ for two molecules of $AgNO_3$ on the tube which is heated to 100° – 150°C. The spraying is stopped when the layer of silver on the outside of the tube is entirely covered by the catalyst resulting from the spraying, whereupon the assembly is heated to a temperature of 600° – 700°C so as to decompose the chromium and silver nitrates in order to form chromium oxide and silver (since the silver oxide $Ag_2O$ is reduced into metallic silver at this temperature).

The assembly consisting of the metal layer and the catalyst formed of chromium oxide and silver constitutes the anode of the fuel cell.

The terminals of the cell formed in this manner are connected to a measuring apparatus by silver wires welded onto each of the electrodes, whereupon this cell is placed in a Pyrex glass tube, which is then placed within an enclosure heated to 750°C.

The inside of the tube is then fed with air at a rate of 400 cc/min while 40 cc/min of pure hydrogen are passed on the outside of the tube. The cell produces an electric power whose voltage-current density characteristic is represented by curve I of FIG. 1 in which the voltage, measured in millivolts, is marked on the ordinate, while current, measured in milliamperes, is marked on the abscissa.

After several hours of operation, hydrogen is replaced with methane, maintaining the same rate of flow (40 cc/min). The characteristic curve defined by the power of the cell (voltage-current density) is given by curve II of FIG. 1.

From FIG. 1, it is seen that the electric power supplied by the cell when burning hydrogen and when burning methane are substantially similar. In the case of the herein disclosed cell, the difference in potential is 565 mv at a current density of 650 ma. This represents a power of 0.368 watts, namely 16.7 mw/cm$^2$, which constitutes good performance if it is taken into consideration that the electrolyte has a thickness of 1.6 mm, knowing that the thickness can be readily lowered to a value 5 times less by decreasing at the same time the internal resistance of the cell in similar proportions, and if it is taken into consideration that zirconia stabilized by $Y_2O_3$ is not the best electrolyte known (as a matter of fact, resistivities which are 3 to 4 times lower are obtained when using heavier rare earth oxides ranging from samarium to lutetium).

By way of comparison, described below are the results when a fuel cell is operated with a nickel anode of conventional type, the electrolyte and the cathode being the same as in the novel cell disclosed herein.

This conventional cell operates for 10 hours with a flow of air on the cathode side of 400 cc/min and a flow of fuel on the anode side of 35 cc/min. The fuel used is a mixture of 75.3% by volume hydrogen and 24.7% steam. The characteristic of the current obtained is given by curve I of FIG. 2.

The previous fuel is then replaced by a mixture of 50% by volume methane and 50% steam, retaining the same rate of flow. The characteristic cell power is given by curve II of FIG. 2.

From this figure it is noted that more than insignificant amount of electric power (current flow) can be obtained only if hydrogen is used as fuel.

Contrarywise, in accordance with the invention, the novel cell can be fed with hydrogen or with methane, identical power characteristics being obtainable.

It is remarkable to note that after ten hours of operation with methane, substantially no deposit of carbon is noted on the anode of the cell according to the present invention; likewise, no decrease in power of the cell is noted at the end of ten hours of operation with methane.

EXAMPLE 2

The novel cell described in Example 1 and which had operated ten hours with methane is used in this Example.

It is fed with air on the cathode side (70 cc/min) and with butane on the anode side (2 cc/min), maintaining the operating temperature at 750°C.

After 30 hours, the cell still operates, producing a power of 0.36 watt (600 ma and 600 mv), namely 16.4 mw/cm$^2$ (power equal to that obtained with hydrogen).

Furthermore, it is noted that in this case, no carbon deposit is produced on the electrode.

Hence, it is clear that the type of anode described in the present invention makes it possible to effect directly the electrochemical combustion of hydrocarbons in a fuel cell with solid electrolyte operating at high temperature, supplying power at a level obtainable with hydrogen.

In the discussion above, wherever the term "specific power of the cell" is used, this term means the ratio of the power of the cell to the surface of the electrode.

What is claimed is:

1. A fuel cell having an electrolyte of solid, fritted ceramic, suitable for operation at high temperatures and for operation on a hydrocarbon or hydrogen as a fuel and oxygen or oxygen containing gas as a comburant, consisting essentially of an electrolyte of a cubic-phase stabilized zirconia, a cathode, and an anode therefor, said anode being porous and consisting essentially of an electron collector wherein said collector is selected from the group consisting of cubic-phase stabilized zirconia modified with a uranium oxide, silver and copper and an oxidation catalyst wherein said catalyst is selected from the group consisting of silver and oxides of chromium, and vanadium.

2. The fuel cell according to claim 1, wherein the oxidation catalyst is as a layer on the electron collector.

3. The fuel cell according to claim 1, wherein the oxidation catalyst is dispersed through the electron collector.

4. A fuel cell having an electrolyte of solid, fritted ceramic, suitable for operation at high temperatures and for operation on a hydrocarbon or hydrogen as a fuel and oxygen or oxygen containing gas as a comburant, consisting essentially of an electrolyte of a cubic-phase stabilized zirconia, a cathode, and an anode therefor, said anode being porous and consisting essentially of an electron collector which is silver and an oxidation catalyst which is a mixture of silver and chromium oxide.

5. The fuel cell according to claim 1, wherein the electron collector is copper.

6. In a method for electro-chemical combustion of hydrogen or a hydrocarbon in the presence of oxygen, consisting of combusting said hydrocarbon in a fuel call having as an electrolyte a cubic-phase stabilized zirconia, a cathode, and an anode, the improvement comprising conducting said combusting of said hydrocarbon at said anode of said fuel cell wherein said anode is selected from the group consisting of cubic-phase stabilized zirconia modified with a uranium oxide, silver and copper and an oxidation catalyst for said hydrocarbon, said anode being porous, whereby substantially no carbon deposits are formed at said anode when said fuel cell is operated with methane as the fuel, said oxidation catalyst is selected from the group consisting of chromium oxide, silver, vanadium oxide.

7. In a method for electro-chemical combustion of hydrogen or a hydrocarbon in the presence of oxygen, consisting of combusting said hydrocarbon in a fuel cell having as an electrolyte a cubic-phase stabilized zirconia, a cathode, and an anode, the improvement comprising conducting said conbusting of said hydrocarbon at said anode of said fuel cell wherein said anode is silver and an oxidation catalyst for said hydrocarbons, said anode being porous, whereby substantially no carbon deposits are formed at said anode when said fuel cell is operated with methane as the fuel, said oxidation catalyst is a mixture of silver and chromium oxide.

* * * * *

UNITED STATES PATENT AND TRADEMARK OFFICE
CERTIFICATE OF CORRECTION

PATENT NO. : 3,981,746
DATED : September 21, 1976
INVENTOR(S) : Jean Bezaudum et al It is certified that error appears in the above-identified patent and that said Letters Patent are hereby corrected as shown below:

Patent Claim 1, column 5, lines 30 and 31, replace "silver... vanadium" by --oxides of chromium, silver, molybdenum, tungsten, vanadium, and copper, salts thereof and mixtures of the same--;

Patent Claim 6, column 6, line 13, replace "call" by --cell--;

Line 24, cancel "chro-";

Line 25, replace by --oxides of chromium, silver, molybdenum, tungsten, vanadium, and copper, salts of the same and mixtures of the same--; and Patent Claim 7, column 6, line 31, replace "conbusting" by --combusting--.

Please add the following new patent claims:

8. The fuel cell according to Claim 1, wherein the electron collector is a cubic-phase stabilized zirconia modified with a uranium oxide.

9. The fuel cell according to Claim 2, wherein the oxidation catalyst is at least one oxide, or a product thereof from reaction of said oxide or oxides which take place in the electrode and is selected from at least one member of the group consisting of oxides of chromium, silver, molybdenum, tungsten, vanadium, and copper.

Signed and Sealed this

Seventh Day of December 1976

[SEAL]

Attest:

RUTH C. MASON
*Attesting Officer*

C. MARSHALL DANN
*Commissioner of Patents and Trademarks*